(12) United States Patent
Henry et al.

(10) Patent No.: US 11,502,988 B2
(45) Date of Patent: Nov. 15, 2022

(54) STABLE MAC ADDRESS CHANGE PROCESS

(71) Applicant: Cisco Technology, Inc., San Jose, CA (US)

(72) Inventors: Jerome Henry, Pittsboro, NC (US);
Robert E. Barton, Richmond (CA);
Mark Grayson, Maidenhead (GB);
Bart A. Brinckman, Nevele (BE)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 17/248,364

(22) Filed: Jan. 21, 2021

(65) Prior Publication Data

US 2022/0231988 A1    Jul. 21, 2022

(51) Int. Cl.
  *H04L 45/74* (2022.01)
  *H04L 61/50* (2022.01)
  *H04L 101/622* (2022.01)

(52) U.S. Cl.
  CPC .............. *H04L 61/50* (2022.05); *H04L 45/74* (2013.01); *H04L 2101/622* (2022.05)

(58) Field of Classification Search
  CPC ......... H04L 45/70; H04L 45/74; H04L 61/20; H04L 61/6022; H04L 29/12009; H04L 29/1233; H04L 61/25
  See application file for complete search history.

(56) References Cited

U.S. PATENT DOCUMENTS

| | | | | |
|---|---|---|---|---|
| 7,975,289 B2* | 7/2011 | Hashimoto | ............ | H04L 63/10 713/168 |
| 2007/0280207 A1* | 12/2007 | Shimizu | ............ | H04L 61/6022 370/353 |
| 2012/0213211 A1* | 8/2012 | Remaker | ............ | H04L 61/6022 370/338 |
| 2014/0086097 A1* | 3/2014 | Qu | ............ | H04L 45/50 370/254 |

(Continued)

FOREIGN PATENT DOCUMENTS

| | | | | |
|---|---|---|---|---|
| CN | 102625986 A | * | 8/2012 | ............ H04L 45/18 |
| WO | 2016078450 A1 | | 5/2016 | |

(Continued)

OTHER PUBLICATIONS

F. Adrangi et al., "Chargeable User Identity," Network Working Group, Jan. 2006, 11 pages.

(Continued)

*Primary Examiner* — Mohamed A Kamara
(74) *Attorney, Agent, or Firm* — Patterson + Sheridan, LLP (57) ABSTRACT

A method includes linking, at an access node, a first media control access (MAC) address of a device to an identifier of the device to establish a communication session between the access node and the device and during the communication session, receiving, at the access node, an indication of a change of the first MAC address to a second MAC address. The method also includes linking, at the access node, the second MAC address to the first MAC address and the identifier and receiving, at the access node, a communication from the device using the second MAC address while maintaining the communication session.

17 Claims, 3 Drawing Sheets

(56) References Cited

U.S. PATENT DOCUMENTS

| | | | |
|---|---|---|---|
| 2014/0254384 A1 | 9/2014 | Ginzboorg et al. | |
| 2015/0139243 A1* | 5/2015 | Nguyen | H04L 49/00 370/392 |
| 2016/0080380 A1 | 3/2016 | Dawoud Shenouda Dawoud et al. | |
| 2016/0135041 A1* | 5/2016 | Lee | H04L 61/2596 726/3 |
| 2017/0289159 A1* | 10/2017 | Adrangi | H04W 12/50 |
| 2018/0288612 A1 | 10/2018 | Mathur et al. | |
| 2018/0324142 A1 | 11/2018 | Adrangi et al. | |

FOREIGN PATENT DOCUMENTS

| | | |
|---|---|---|
| WO | 2017000832 A1 | 1/2017 |
| WO | 2020150357 A1 | 7/2020 |

OTHER PUBLICATIONS

"IEEE Draft Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications," in IEEE P802.11-REVmd/D3.0, Oct. 2019, vol. No., pp. 1-4647, Nov. 18, 2019. [Abstract Only].

Wood Apple Inc C: "Linkable Identifiers; draft-wood-linkable-identifiers-01.txt". Linable Identifiers; draft-wood-linkable-identifiers-01.txt; Internet-Draft: Network Working Group, Internet Engineering Task Force, IETF; Standardworkingdraft, Internet Society (ISOC) 4, Rue Des Fal, No. 1, dated Apr. 24, 2019, pp. 1-11.

Pct, Notification of Transmittal of The International Search Report and The Written Opinion of The International Searching Authority, or The Declaration for Application PCT/US2022/070155 dated Apr. 19, 2022.

* cited by examiner

STABLE MAC ADDRESS CHANGE PROCESS

TECHNICAL FIELD

Embodiments presented in this disclosure generally relate to network communications. More specifically, embodiments disclosed herein relate to maintaining communication sessions during media access control (MAC) address rotations.

BACKGROUND

A device can connect to an access node in a network to communicate information to other devices over the network. Traditionally, the access node identifies and tracks the device using a media access control (MAC) address of the device, which was assumed to be static. Devices, however, may use non-static MAC addresses. For example, during a communication session, a device may rotate or change its MAC address for a variety of reasons (e.g., privacy). If the access node assumes that the MAC address is static, then the device may lose its connection with the access node as a result of the MAC address rotation or change.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes linking, at an access node, a first media control access (MAC) address of a device to an identifier of the device to establish a communication session between the access node and the device and during the communication session, receiving, at the access node, an indication of a change of the first MAC address to a second MAC address. The method also includes linking, at the access node, the second MAC address to the first MAC address and the identifier and receiving, at the access node, a communication from the device using the second MAC address while maintaining the communication session.

Example Embodiments

This disclosure describes a system that allows a device to maintain a communication session with a network access node when the device changes or rotates its MAC address. The access node links the device's MAC address with an identifier to establish the session. During the session, the device may communicate an indication to the access node to inform the access node that the device will rotate or change its MAC address to a new MAC address. The access node then links the new MAC address to the old MAC address and the identifier. In this manner, when the device sends a communication using the new MAC address, the access node may determine from the link between the new MAC address and the identifier or the link between the new MAC address and the old MAC address that the communication is from the device. As a result, the communication session is maintained and the device does not experience a service interruption as a result of the MAC address rotation or change, in particular embodiments.

Figure 1:
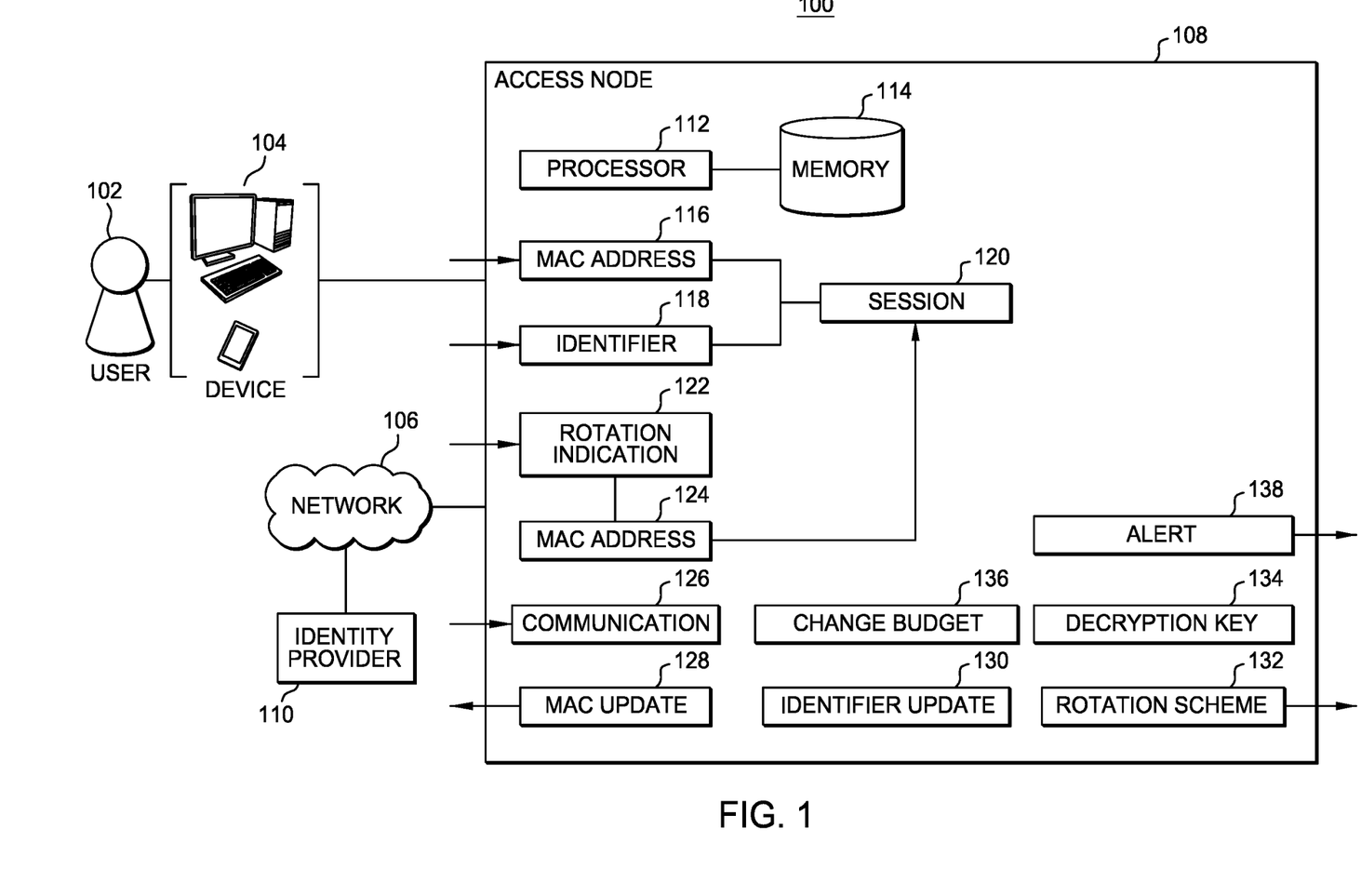
FIG. 1 illustrates an example system.

FIG. 1 illustrates an example system 100. As seen in FIG. 1, the system 100 includes one or more devices 104, a network 106, an access node 108, and an identity provider 110. Generally, the access node 108 tracks the MAC address changes or rotations of the device 104 to maintain a session between the device 104 and the access node 108. In particular embodiments, because the access node 108 tracks the MAC address rotations or changes, the device 104 does not experience a service interruption or disruption after rotating or changing MAC addresses.

A user 102 may use the device 104 to interact with other components of the system 100. For example, the device 104 may communicate with the access node 108 or the identity provider 110. Additionally, the device 104 may signal to the access node 108 when the device 104 will rotate or change its MAC address. The device 104 may change or rotate its MAC address to maintain or enhance the privacy of the user 102 or the device 104. For example, by rotating or changing the MAC address, it may become more difficult to track or log the communications of the user 102 or the device 104 based on the MAC address.

The device 104 may establish a connection with the access node 108 before the device is allowed to send communications over the network 106 through the access node 108. The access node 108 may broadcast an identifier of the access node 108 or of the network 106. When the user 102 or the device 104 move within a service region of the access node 108, the device 104 may detect the broadcasted identity of the access node 108 or the network 106. The user 102 or the device 104 may then attempt to connect to the network 106 through the access node 108. The access node 108 may then determine whether access should be allowed. For example, the access node 108 may authenticate the user 102 or the device 104 before allowing the connection from the device 104.

In certain embodiments, the device 104 and the access node 108 belong to an identity federation (e.g., OpenRoaming), which may be a trusted third party service that is responsible for authenticating the user 102 or the device 104. In these embodiments, the third party service provide the identity provider 110, and the device 104 and the access node 108 rely on the identity provider 110 to authenticate the user 102 and the device 104. For example, when authentication is needed, the access node 108 may open a communication channel between the device 104 and the identity provider 110 through the network 106. The identity provider 110 may then authenticate the device 104. For example, the device 104 may provide credentials (e.g., credentials of the user 102 or of the device 104) to the identity provider 110. The identity provider 110 may use these credentials to authenticate the user 102 or the device 104. The identity provider 110 may then provide an identifier (e.g., a token) that the user 102 or device 104 is authenticated. The identity provider 110 may provide the identifier to the access node 108 or the device 104. If the identifier is provided to the access node 108, then the access node 108 may use the identifier to determine the identity of the user 102 or the device 104. The access node 108 may then establish a communication session with the device 104. If the identifier is provided to the device 104, the device 104 may communicate the identifier to the access node 108. The access node 108 may then use the identifier to identify the user 102 or the device 104 and to establish a communication session with the device 104. In this manner, the user 102 or device 104 may connect to any access node 108 or network 106 that belongs to the identity federation. Additionally, the access nodes 108 and networks 106 that belong to the identity federation do not need to store and maintain the credentials of the user 102 and device 104.

The identity provider 110 may be an optional component of the system 100. Stated differently, the device 104 or the access node 108 need not belong to an identity federation. When the identity provider 110 is absent or unused, the user 102 or the device 104 may authenticate themselves directly with the access node 108. For example, the user 102 or the device 104 may provide an identifier that includes authentication credentials directly to the access node 108, and the access node 108 may use these credentials to authenticate the user 102 or the device 104. After authentication is complete, the access node 108 may establish a communication session with the device 104.

The device 104 includes any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The access node 108 serves as an entry point to the network 106. The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The identity provider 110 may be an entity or service separate from the access node 108 that authenticates the user 102 or the device 104. For example, the identity provider 110 may store credentials of the user 102 or the device 104.

When the user 102 or the device 104 communicates credentials to the identity provider 110, the communicated credentials may be compared with the stored credentials to identify a match. If the identity provider 110 identifies a match, the identity provider 110 may consider the user 102 or device 104 associated with the match credentials to be authenticated. The identity provider 110 may then communicate an identifier to the access node 108 or the device 104 that indicates the identity of the user 102 or the device 104. The identifier may further indicate that the user 102 or the device 104 have been authenticated.

The access node 108 forms a portion of the network 106. The access node 108 may send and receive communications over the network 106. As seen in FIG. 1, the access node 108 includes a processor 112 and a memory 114, which are configured to perform any of the actions or functions of the access node 108. In particular embodiments, the access node 108 tracks the MAC address rotations or changes of the device 104, so that the device 104 does not experience service interruptions or disruptions when rotating or changing MAC addresses.

The processor 112 is any electronic circuitry, including, but not limited to microprocessors, application specific integrated circuits (ASIC), application specific instruction set processor (ASIP), and/or state machines, that communicatively couples to memory 114 and controls the operation of the access node 108. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on memory to perform any of the functions described herein. The processor 112 controls the operation and administration of the access node 108 by processing information (e.g., information received from the device 104, network 106, and memory 114). The processor 112 may be a programmable logic device, a microcontroller, a microprocessor, any suitable processing device, or any suitable combination of the preceding. The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The access node 108 receives a MAC address 116 of the device 104. The access node 108 may receive the MAC address 116 before, during, or after the device 104 is authenticated. The access node 108 may also receive an identifier 118 for the device 104. As discussed previously, the device 104, or the identity provider 110, may provide the identifier 118 to the access node 108. When the device 104 is authenticated the identifier 118 may be a token that identifies the device 104 or the user 102. The access node 108 may link the MAC address 116 to the identifier 118 to establish a session 120. The session 120 allows the device 104 to communicate through the access node 108. For example, the session 120 allows the device 104 to send and receive communications over the network 106 through the access node 108. After the session 120 is established, the device 104 may send and receive communications over the network 106 through the access node 108 using the MAC address 116.

During the session 120, the device 104 may determine that the device 104 should rotate or change its MAC address 116. In response to this determination, the device 104 communicates a rotation indication 122 to the access node 108. The rotation indication 122 indicates to the access node 108 that the device 104 will rotate or change its MAC address 116. The rotation indication 122 may include the new MAC address 124 to which the device 104 will rotate or change the MAC address 116. The access node 108 may link the MAC address 124 to one or more of the session 120, the MAC address 116, or the identifier 118. In this manner, the access node 108 will be able to link communications 126 sent using the MAC address 124 to the session 120, the MAC address 116, or the identifier 118. In certain embodiments, the rotation indication 112 indicates that the device 104 has changed its MAC address 116 to the MAC address 124. The device 104 may communicate the rotation indication 122 to the access node 108 after the device 104 has rotated or changed its MAC address or concurrently with the rotation or changing of the MAC address.

For example, after the device 104 rotates or changes its MAC address 116 to MAC address 124, the access node 108 can properly route communications 126 that include the MAC address 124 to and from the device 104. If the access node 108 has not linked the MAC address 124 to the session 120, the MAC address 116, or identifier 118, the access node 108 may treat these communications 126 as being from a new, unrecognized device. The access node 108 may then reject the communications 126 or may request that the new device authenticate itself. In both scenarios, the device 104 experiences a service interruption or disruption, because its communications are no longer recognized by the access node 108. Because the access node 108 links the MAC address 124 to the session 120, the MAC address 116, or the identifier 118, communications 126 from the device 104 that use the MAC address 124 are recognized by the access node 108. For example, the access node 108 may receive the communication 126 and determine, based on the previously established links, that the MAC address 124 is linked to the session 120, the MAC address 116, or the identifier 118. The access node 108 may then treat the communication 126 as belonging to the device 104. In this manner, the device 104 does not experience a service disruption or interruption after rotating its MAC address 116 to the MAC address 124, in certain embodiments. Additionally, the access node 108 maintains the session 120, and does not create a new session in response to the device 104 changing its MAC address 116 to the MAC address 124.

In certain embodiments, the access node 108 notifies the identity provider 110 of the MAC address rotation or change. The access node 108 communicates a MAC update 128 to the identity provider 110. The MAC update 128 may include the MAC address 124 and the identifier 118. The access node 108 may communicate the MAC update 128 after the access node 108 has linked the MAC address 124 to the session 120, the MAC address 116, or the identifier 118. By communicating the MAC update 128 to the identity provider 110, the access node 108 may notify the identity provider 110 that the device 104 identified by the identifier 118 has changed its MAC address to the MAC address 124.

In certain embodiments, the identity provider 110 rotates or changes the identifier 118 for the device 104. For example, the identity provider 110 may rotate or change the identifier 118 to improve security or privacy of the user 102 or device 104. The identity provider 110 may communicate an updated identifier 130 to the access node 108 to indicate to the access node 108 that the identifier 118 is changing or rotating to the identifier 130. The identity provider 110 may communicate the identifier 130 in response to the access node 108 communicating the MAC update 128 to the identity provider 110. Stated differently, the identity provider 110 may rotate or change the identifier 118 for the device 104 in response to the device 104 rotating or changing its MAC address 116 to the MAC address 124. After the access node 108 receives the identifier 130, the access node 108 may link the identifier 130 to the MAC address 116, the identifier 118, the session 120, or the MAC address 124. In some embodiments, the access node 108 may replace the identifier 118 with the identifier 130. In this manner, both the MAC address 116 and the identifier 118 may be rotated or changed without disrupting or interrupting the session 120 between the device 104 and the access node 108. As a result, the security and privacy of the user 102 or the device 104 is improved in certain embodiments.

In some embodiments, the device 104 may trigger the rotation or change of the identifier 118. The device 104 may communicate the updated identifier 130 to the access node 108. After the access node 108 has linked the identifier 130 from the device 104 to the MAC address 116, the identifier 118, the MAC address 124, or the session 120, the access node 108 may communicate the identifier 130 to the identity provider 110. For example, if the device 104 rotates or changes the identifier 118 after rotating or changing the MAC address 116 to the MAC address 124, the access node 108 communicates the identifier 130 and the MAC address 124 to the identity provider 110. The identity provider 110 may then link the identifier 130 with the MAC address 124. The identity provider 110 then knows that the device 104 is identified using the MAC address 124 or the identifier 130.

In embodiments where the identity provider 110 is absent or unused, the device 104 may decide to rotate or change the identifier 118. The access node 108 may receive the identifier 130 from the device 104 when the device 104 determines that the identifier 118 should be rotated or changed. The access node 108 may link the identifier 130 with the MAC address 116, the identifier 118, the session 120, or the MAC address 124. Additionally or alternatively, the access node 108 may replace the identifier 118 with the identifier 130. In this manner, the device 104 may rotate or change both its MAC address 116 and the identifier 118.

In certain embodiments, the access node 108 supports a limited number of MAC address rotation schemes 132. These rotation schemes 132 may regulate certain aspects of the MAC address rotation. For example, the rotation schemes 132 may limit the frequency of MAC address rotations or changes. As another example, the rotation schemes 132 may limit the ranges of allowable MAC addresses. The access node 108 may communicate the rotation schemes 132 supported by the access node 108 to the device 104 before or after the device 104 establishes the session 120 with the access node 108. The device 104 may follow the supported rotation schemes 132 when rotating or changing the MAC address 116.

In particular embodiments, the access node 108 allots a MAC address rotation or change budget 136 to the device 104. The budget 136 may indicate a number of times that the device 104 may rotate or change its MAC address 116. For example, when the device 104 communicates the rotation indication 122 to the access node 108, the access node 108 may check the budget 136 to see if the device 104 has budget remaining to rotate or change its MAC address 116. If the device has sufficient budget 136 remaining, then the access node 108 may allow the device 104 to rotate or change its MAC address 116 to the MAC address 124. If the device 104 does not have sufficient budget 136 remaining, the access node 108 may prevent the rotation or change of the MAC address 116. Additionally, the access node 108 may communicate an alert 138 to the device 104. The alert 138 may inform the device 104 that the device 104 has exceeded the budget 136 of MAC address rotations or changes. In some embodiments, the budget 136 may be specified by one or more of the rotation schemes 132.

In some embodiments, the access node 108 may locate a decryption key 134 to be used after the device 104 rotates or changes its MAC address 116 to the MAC address 124. For example, the device 104 may encrypt the rotation indication 122 so that when the access node 108 receives the rotation indication 122, the access node 108 locates the decryption key 134 to decrypt the rotation indication 122. In this manner, the device 104 may ensure that the access node 108 has located an appropriate decryption key 134 before the device 104 begins communicating using the new MAC address 124.

Figure 2:
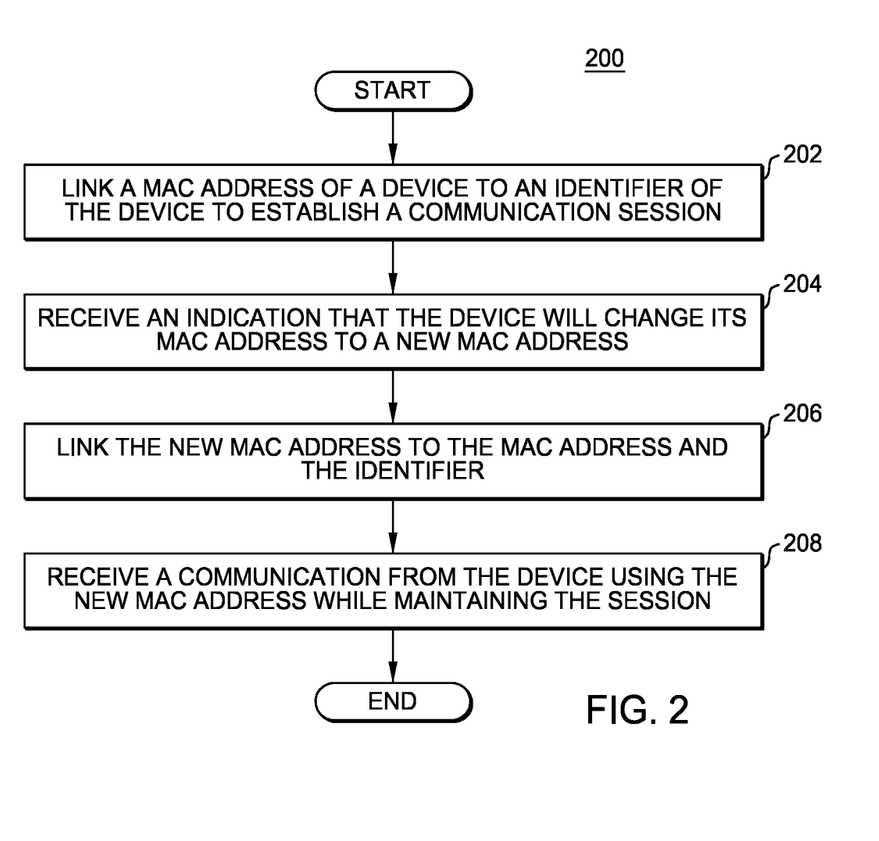
FIG. 2 is a flowchart of an example method in the system of FIG. 1.

FIG. 2 is a flowchart of an example method 200 in the system 100 of FIG. 1. The access node 108 may perform the method 200. In particular embodiments, by performing the method 200, the access node 108 allows a device 104 to rotate or change its MAC address 116 without experiencing service interruptions or disruptions.

In block 202, the access node 108 links a MAC address 116 of a device 104 to an identifier 118 of the device 104 to establish a communication session 120. The identifier 118 may be provided by the device 104 or an identity provider 110 after the device 104 has authenticated itself. The device 104 may also communicate its MAC address 116 to the access node 108. The access node 108 may link the MAC address 116 and the identifier 118 to establish the communication session 120. After the communication session 120 is established, the device 104 may send and receive communications over a network 106 through the access node 108.

In block 204 the access node 108 receives an indication 122 that the device 104 will change its MAC address 116 to a new MAC address 124. The indication 122 may include the new MAC address 124. In block 206, the access node 108 links the new MAC address 124 to the MAC address 116 and the identifier 118. In this manner, the access node 108 indicates that the MAC address 124 belongs to the device 104 assigned to the MAC address 116 and the identifier 118. As a result, the new MAC address 124 is linked to the existing communication session 120.

In block 208, the access node 108 receives a communication 126 from the device 104 using the new MAC address 124 while maintaining the communication session 120. Because the new MAC address 124 is linked to the MAC address 116, the identifier 118, or the session 120, the access node 108 may identify the communication 126 as coming from the device 104 even though the communication 126 uses the new MAC address 124. As a result, the device 104 does not experience service interruptions or disruptions after rotating or changing its MAC address 116 to the MAC address 124.

Figure 3:
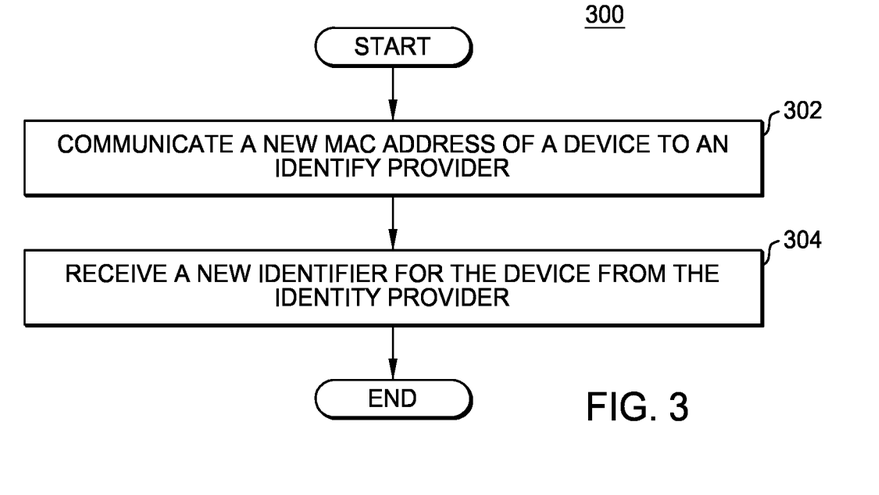
FIG. 3 is a flowchart of an example method in the system of FIG. 1.

FIG. 3 is a flowchart of an example method 300 in the system 100 of FIG. 1. The access node 108 may perform the method 300. In particular embodiments, by performing the method 300, the access node 108 allows for the identifier 118 of the device 104 to rotate or change without interrupting or disrupting the communication session 120. The method 300 may be performed after the method 200.

In block 302, the access node 108 communicates a new MAC address 124 of a device 104 to an identity provider 110. The access node 108 may communicate the new MAC address 124 after receiving and linking the new MAC address 124 to the MAC address 116, the identifier 118, or the session 120. The access node 108 may communicate the new MAC address 124 to the identity provider 110 to inform the identity provider 110 that the device 104 is using the new MAC address 124. In some embodiments, the access node 108 may also communicate the identifier 118 of the device 104 to the identity provider 110 to identify the device 104 as having the new MAC address 124.

In block 304, the access node 108 receives a new identifier 130 for the device 104 from the identity provider 110. The identity provider 110 may change the identifier 118 to the identifier 130 to improve the security or privacy of the user 102 or the device 104. The identity provider 110 may change the identifier 118 in response to the indication that the device 104 has changed its MAC address 116 to the new MAC address 124. In some embodiments, the identity provider 110 may change the identifier 118 of the device 104 even though the device 104 has not changed or rotated its MAC address 116. In this manner, both the MAC address 116 and the identifier 118 may be changed or rotated to improve the security or privacy of the user 102 or the device 104. Importantly, the MAC address 116 and the identifier 118 may be rotated or changed independently of each other.

Figure 4:
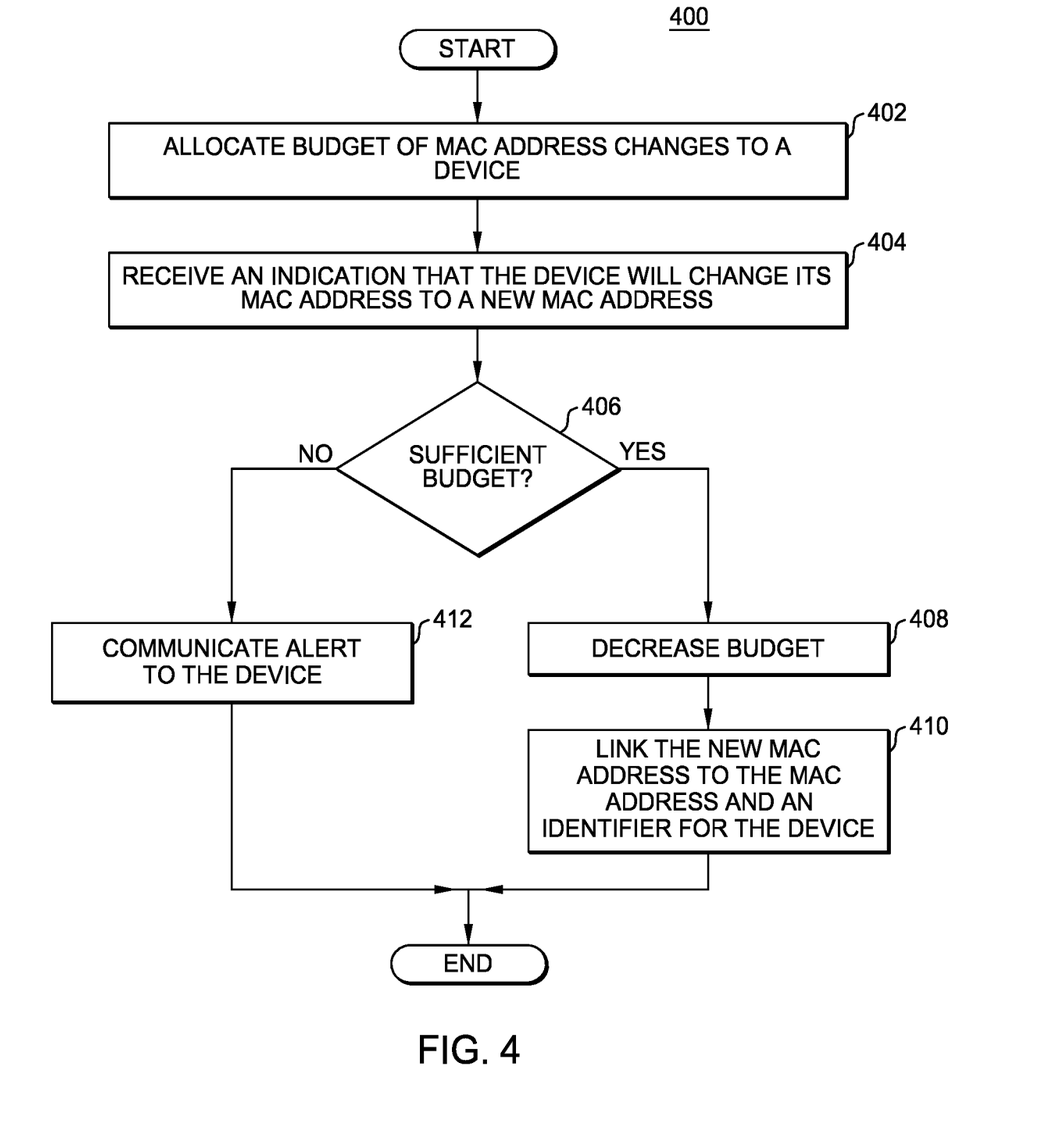
FIG. 4 is a flowchart of an example method in the system of FIG. 1.

FIG. 4 is a flowchart of an example method 400 in the system 100 of FIG. 1. The access node 108 may perform the method 400. In particular embodiments, by performing the method 400, the access node 108 controls the MAC address rotations or changes in the system 100. In some embodiments, the method 400 is performed as an alternative to the method 200.

In block 402, the access node 108 allocates a budget 136 of MAC address changes to a device 104. The budget 136 may indicate a number of times that the device 104 may rotate or change its MAC address 116. Additionally or alternatively, the budget 136 may indicate a frequency at which the device 104 may rotate or change its MAC address 116. In certain embodiments, the budget 136 is specified by a rotation scheme 132 supported by the access node 108.

In block 404, the access node 108 receives an indication 122 that the device 104 will change its MAC address 116 to a new MAC address 124. The block 404 may be similar to the block 204 in the method 200. After the access node 108 receives the indication 122, the access node 108 determines whether there is sufficient budget 136 in block 406. For example, the access node 108 may determine whether the budget 136 indicates that the device 104 has a sufficient number of MAC address rotations or changes remaining. As another example, the access node 108 may determine whether the device 104 is rotating or changing its MAC address 116 at a frequency that exceeds the frequency indicated by the budget 136.

If the access node 108 determines that there is not sufficient budget 136 remaining, the access node 108 communicates an alert 138 to the device 104 in block 412. The alert 138 may indicate to the device 104 that the MAC address rotation is not allowed. In response, the device 104 may not proceed with the MAC address rotation or change.

If the access node 108 determines that there is sufficient budget 136 remaining, the access node 108 may decrease the budget 136 in block 408. For example, the access node 108 may decrement the number of MAC address rotations or changes indicated by the budget 136. As another example, the access node 108 may update a frequency at which the device 104 is rotating or changing its MAC address 116. In block 410, the access node 108 links the new MAC address 124 to the MAC address 116 and an identifier 118 of the device 104. Block 410 may be similar to the block 206 in the method 200.

In summary, an access node 108 to a network 106 tracks the MAC address rotations or changes of a device 104. The access node 108 links the device's 104 MAC address 116 with an identifier 118 to establish a session 120. During the session, the device may communicate an indication 122 to the access node 108 to inform the access node 108 that the device 104 will rotate or change its MAC address 116 to a new MAC address 124. The access node 108 then links the new MAC address 124 to the old MAC address 116 and the identifier 118. In this manner, when the device 104 sends a communication 126 using the new MAC address 124, the access node 108 may determine from the link between the new MAC address 124 and the identifier 118 or the link between the new MAC address 124 and the old MAC address 116 that the communication 126 is from the device 104. As a result, the communication session 120 is maintained and the device 104 does not experience a service interruption as a result of the MAC address rotation or change, in particular embodiments In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   linking, at an access node, a first media control access (MAC) address of a device to a first identifier of the device different from the first MAC address to establish a communication session between the access node and the device;
   during the communication session, receiving, at the access node, a first indication of a change of the first MAC address to a second MAC address;
   linking, at the access node, the second MAC address to the first MAC address and the first identifier;
   receiving, at the access node, a communication from the device using the second MAC address while maintaining the communication session;
   receiving, at the access node, a second indication that the device will change the first identifier to a second identifier; and
   in response to the second indication, communicating the second MAC address and the second identifier to an identity provider of the device.

2. The method of claim 1, further comprising communicating, by the access node, the second MAC address and the first identifier to the identity provider of the device after linking the second MAC address to the first identifier.

3. The method of claim 2, further comprising, in response to communicating the second MAC address and the first identifier to the identity provider, receiving, at the access node and from the identity provider, the second identifier.

4. The method of claim 1, further comprising communicating, by the access node and to the device, an indication of a MAC address rotation scheme that is supported by the access node.

5. The method of claim 1, further comprising:
   allotting a budget of MAC address changes to the device; and
   communicating an alert to the device when the device attempts to change a MAC address in excess of the budget.

6. The method of claim 1, further comprising locating a decryption key of the device based on the first indication.

7. An access node comprising:
   a memory; and
   a hardware processor communicatively coupled to the memory, the hardware processor configured to:
      link a first media control access (MAC) address of a device to a first identifier of the device different from the first MAC address to establish a communication session between the access node and the device;
      during the communication session, receive a first indication of a change of the first MAC address to a second MAC address;
      link the second MAC address to the first MAC address and the first identifier;
      receive a communication from the device using the second MAC address while maintaining the communication session;
      receive a second indication that the device will change the first identifier to a second identifier; and
      in response to the second indication, communicate the second MAC address and the second identifier to an identity provider of the device.

8. The access node of claim 7, wherein the hardware processor is further configured to communicate the second MAC address and the first identifier to the identity provider of the device after linking the second MAC address to the first identifier.

9. The access node of claim 8, wherein the hardware processor is further configured to, in response to communicating the second MAC address and the first identifier to the identity provider, receive, from the identity provider, the second identifier.

10. The access node of claim 7, wherein the hardware processor is further configured to communicate, to the device, an indication of a MAC address rotation scheme that is supported by the access node.

11. The access node of claim 7, wherein the hardware processor is further configured to:
    allot a budget of MAC address changes to the device; and
    communicate an alert to the device when the device attempts to change a MAC address in excess of the budget.

12. The access node of claim 7, wherein the hardware processor is further configured to locate a decryption key of the device based on the first indication.

13. An access node comprising:
    a memory; and
    a hardware processor communicatively coupled to the memory, the hardware processor configured to:
       during a communication session with a device, receive a first indication of a change of a first MAC address to a second MAC address;
       link the second MAC address to the first MAC address and a first identifier of the device different from the first MAC address and the second MAC address;
       receive a communication from the device using the second MAC address while maintaining the communication session;
       receive a second indication that the device will change the first identifier to a second identifier; and
       in response to the second indication, communicate the second MAC address and the second identifier to an identity provider of the device.

14. The access node of claim 13, wherein the hardware processor is further configured to communicate the second MAC address and the first identifier to the identity provider of the device after linking the second MAC address to the first identifier.

15. The access node of claim 14, wherein the hardware processor is further configured to, in response to communicating the second MAC address and the first identifier to the identity provider, receive, from the identity provider, the second identifier.

16. The access node of claim 13, wherein the hardware processor is further configured to communicate, to the device, an indication of a MAC address rotation scheme that is supported by the access node.

17. The access node of claim 13, wherein the hardware processor is further configured to:
   allot a budget of MAC address changes to the device; and
   communicate an alert to the device when the device attempts to change a MAC address in excess of the budget.

* * * * *